United States Patent Office 3,318,534
Patented May 9, 1967

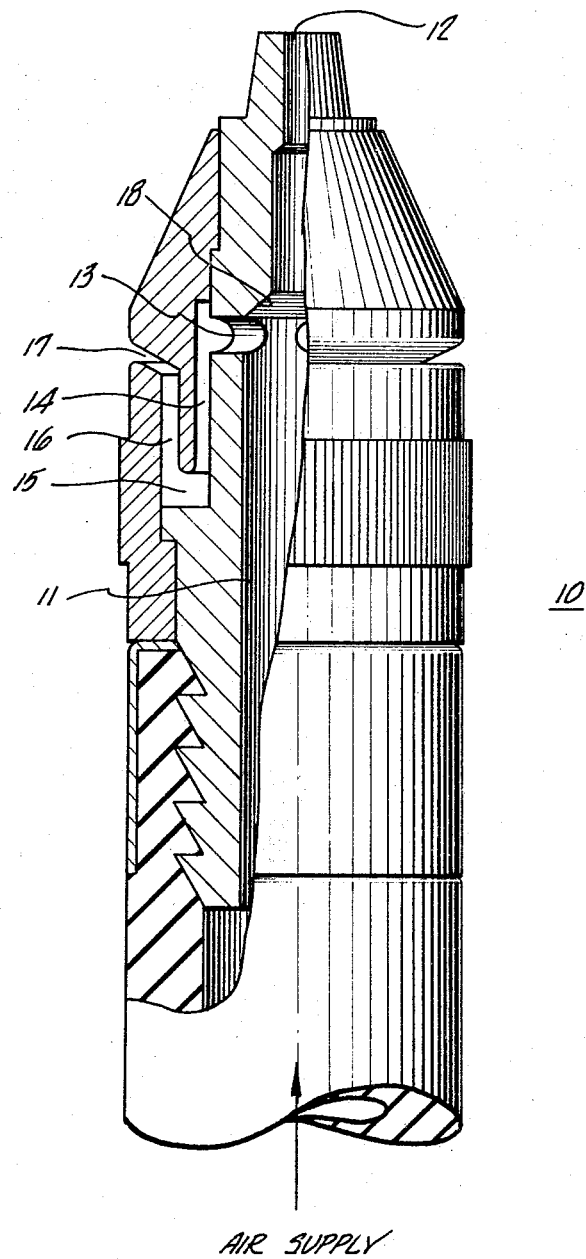

3,318,534
AIR NOZZLE
Jack Stolteben, 1323 Oak St., South Pasadena, Calif. 91030
Filed June 7, 1965, Ser. No. 461,787
7 Claims. (Cl. 239—291)

This invention relates to air nozzles and, more particularly, to an improved nozzle which provides a uniform protective air shield to guard the operator of the nozzle.

High velocity streams of compressed air are widely used in industry for cleaning and other applications. Such air streams may, for example, be used to blow-clean work pieces during and subsequent to machining operations. Use of such air streams present a danger to the operator, however, since chips and particles dislodged by the air often bounce back toward the operator presenting a serious safety hazard, particularly with respect to eye injuries.

Attempts have been made to design safety features into air nozzles. One attempt, designed to reduce the bounce-back hazard, provided six radially positioned holes, spaced from the main air exit hole, which fed into an annular outlet. Although an air shield of sorts was thereby provided, the flow of air making up such shield was far from uniform. The air passing through each radially positioned hole passed through the annular outlet in a manner resembling the spoke of a wheel. As a result, any chips or particles which bounced back toward the operator were certain to be deflected by the "shield" only if they hit one of the six "spokes." Any particles passing between the "spokes" would remain a serious safety hazard to the operator.

An advantage of the present invention is that it provides a uniform protective sheaf of air which forms a complete air shield about an air nozzle.

Another advantage of the present invention is that it provides an improved air nozzle.

These and other advantages are realized by means of an air nozzle having a plenum chamber which communicates between a plurality of radially positioned holes, spaced from the main exit hole, and an annular outlet. A baffle is used to deflect a portion of the airflow from the main passageway into the plenum chamber. The portion of airflow diverted into the plenum chamber is first caused to reverse direction from the direction of airflow within the main passageway. The portion of airflow within the chamber is then caused to reverse its direction again, by means of two substantially right angle turns, before passing to the annular outlet. In passing through these passageways within the plenum chamber, sufficient turbulence is created within the airflow to mix the air within the chamber so that a uniform supply of air is presented to the annular outlet. Consequently, a uniform sheaf of air is provided by the annular outlet which provides an effective shield against chips and particles hazardous to the operator. The outlet is advantageously inclined slightly toward the main exit hole and the cross-sectional area of the outlet is advantageously smaller than that of any of the passageways within the plenum in order to increase the velocity of the protective air screen provided by the outlet.

The manner of operation of the present invention and the manner in which it achieves the above advantages may be more clearly understood by reference to the following detailed description when considered with the drawing in which:

The single figure depicts in side elevation and broken-away view, an air nozzle embodying the present invention.

The single figure of the drawing depicts an air nozzle 10 which embodies the present invention. Compressed air supplied from an air supply (not shown) is supplied to main air passage 11 and a portion of this airflow exits through main exit hole 12 of the nozzle to do whatever work the air supply is being utilized for. A portion of the airflow, however, is deflected by baffle 18 through aperture 13. Aperture 13 is one of six identical apertures radially positioned about the main air passage. The portion of the airflow deflected through aperture 13 and the other five identical apertures passes into a plenum chamber having distribution passage 14, equalization passage 15, and dispersion passage 16, before exiting through annular outlet 17. The plenum chamber and its three passageways are annular in shape and air passing through aperture 13 and the other radially disposed apertures enters the single plenum chamber.

The direction of airflow in the main air passage 11 is upward, as shown in FIGURE 1. The portion of airflow deflected by baffle 18 through aperture 13 into distribution passage 14 is caused to reverse its direction and flow downward within passage 14. Turbulence created within the passage 14 by reason of this forced changing of flow direction causes a mixing of the portions of airflow entering the distribution chamber through the six apertures 13. Upon reaching the end of the distribution passage 14, airflow within the plenum chamber reaches equalization passage 15 at which point it is forced to change direction again and turbulence within passage 15 causes a further mixing of air within the plenum chamber. Upon entering passage 15, the airflow is caused to make a substantially right angle turn and upon leaving this passage and entering dispersion passage 16, the airflow is caused to make another substantially right angle turn.

The direction of airflow within dispersion passage 16 is substantially parallel to the direction of airflow within the main air passage 11. Turbulence within passage 16 causes still further mixing of the air within this passage. Upon reaching the end of passage 16, the airflow within the plenum chamber reaches annular outlet 17. Because of the turbulence created within the passages of the plenum chamber the air within the chamber, upon reaching annular outlet 17, is uniformly distributed around the circumference of nozzle 10. Air exiting from outlet 17 is therefore uniformly distributed about the circumference of the nozzle and provides an effective protective shield to guard the operator against chips and particles which otherwise might bounce back from the work area toward the operator thereby creating a serious safety hazard.

Annular outlet 17 is advantageously inclined slightly toward main exit hole 12. Furthermore, the cross-sectional area of outlet 17 is advantageously substantially smaller than that of any of the passages 14, 15, and 16, in order to increase the velocity of the protective air screen provided by the flow of air exiting from outlet 17.

Although the present invention is not limited to nozzles of any particular size, a nozzle has been constructed embodying the present invention in which the main exit hole 12 had a cross-sectional area of approximately .0045 square inch; the distribution passage 14 had a cross sectional area of approximately .0236 square inch; the equalization passage 15 had a cross-sectional area of approximately .045 square inch; the dispersion passage 16 had a cross-sectional area of approximately .0218 square inch; and the annular outlet 17 had a cross-sectional area of approximately .0032 square inch.

Furthermore, although the present invention has been described in connection with an air nozzle, it could easily be incorporated into any nozzle through which a fluid is transmitted under pressure, and in connection with the use of which a safety hazard exists as a result of possible bounce-back of particles dislodged at a work area by the main fluid stream exiting through the main exit hole.

What has been described is considered to be only one

What is claimed is:
1. In a nozzle arrangement having an outlet for the main flow of fluid and a plurality of apertures disposed inwardly of the main outlet for directing a sheaf of protective air around the main outlet, the improvement which comprises:
 a chamber connecting the plurality of apertures to an annular outlet inclined toward the main outlet, the chamber having two passageways for twice reversing the flow of air passing from a main nozzle source to the annular outlet.

2. In an air nozzle arrangement having an outlet for the main flow of air and annular outlet means disposed inwardly of the main outlet and inclined toward the main outlet for directing a sheaf of protective air around the main outlet, the improvement which comprises:
 a chamber connecting the annular outlet means with the main nozzle air source; and
 baffle means for deflecting a portion of air from the main nozzle source into the chamber;
 the chamber having two passageways for twice reversing the direction of air flowing from the main nozzle to the annular outlet via the chamber;
 the annular outlet having a cross-sectional area substantially less than that of either passageway.

3. A nozzle having:
 a main fluid exit hole communicating with a passageway adapted to be coupled with a source of fluid;
 a plurality of apertures disposed about the passageway and oriented approximately 90° with respect to the main exit hole;
 baffle means within the passageway for deflecting a portion of the fluid through the apertures; and
 a chamber connecting the plurality of apertures to an annular outlet inclined toward the main exit hole;
 the chamber having two substantially parallel passageways for twice reversing the direction of fluid flowing from the source to the annular outlet via the chamber;
 the annular outlet having a cross-sectional area substantially less than that of either passageway within the chamber.

4. An air nozzle having:
 a main air exit hole communicating with a main passageway adapted to be coupled with an air source;
 a plurality of apertures disposed about the circumference of the main passageway and spaced from the main exit hole;
 baffle means within the passageway for deflecting a portion of the airflow within the passageway through the plurality of apertures; and
 a chamber connecting the plurality of apertures to an annular outlet;
 the chamber having two substantially parallel passageways for twice reversing the direction of air flowing from the source to the annular outlet via the chamber;
 the annular outlet having a cross-sectional area less than that of either passageway within the chamber.

5. An air nozzle according to claim 4 in which the two substantially parallel passageways are substantially parallel to the flow of air within the main passageway.

6. An air nozzle having:
 a main air exit hole communicating with a passageway adapted to be coupled with an air source
 a plurality of apertures disposed about the circumference of the passageway and spaced from the main exit hole;
 baffle means within the passageway for deflecting a portion of the airflow within the passageway through the plurality of apertures; and
 a chamber connecting the plurality of apertures to an annular outlet inclined toward the main exit hole;
 the chamber including a first means for reversing the direction of flow of air within the chamber from its direction within the passageway, a second means for again reversing the direction of airflow within the chamber, and means intermediate the first and second means for effecting the mixing of air within the chamber.

7. An air nozzle having:
 a main air exit hole communicating with a main passageway adapted to be coupled with an air source;
 a plurality of apertures disposed about the circumference of the passageway and spaced from the main air exit hole, the apertures being oriented approximately 90° with respect to the main exit hole;
 baffle means within the main passageway for deflecting a portion of the airflow within the passageway through the plurality of apertures; and
 a plenum chamber connecting the plurality of apertures to an annular outlet inclined toward the main exit hole;
 the chamber including a distribution passage communicating with the plurality of apertures for reversing the direction of flow of air within the plenum chamber from its direction within the passageway, an equalization passage communicating with the distribution passage for diverting the flow of air received from the distribution passage by approximately 90°, and a dispersion passage communicating with the equalization passage for diverting the flow of air received from the equalization passage by approximately 90°, the airflow in the dispersion passage being opposite to that in the equalization passage;
 the annular outlet communicating with the dispersion passage and having a cross-sectional area substantially less than that of any of the aforesaid passages within the plenum chamber.

References Cited by the Examiner
UNITED STATES PATENTS

| | | | |
|---|---|---|---|
| 2,529,223 | 11/1950 | Moen | 239—587 X |
| 2,557,106 | 6/1951 | Hughes | 239—587 X |
| 2,560,862 | 7/1951 | Harrison | 239—553.5 |
| 3,117,726 | 1/1964 | Schoberg | 239—291 |

M. HENSON WOOD, JR., *Primary Examiner.*

V. M. WIGMAN, *Assistant Examiner.*